United States Patent
Li et al.

(10) Patent No.: US 6,560,230 B1
(45) Date of Patent: May 6, 2003

(54) PACKET SCHEDULING METHODS AND APPARATUS

(75) Inventors: Renwei Li, Vancouver (CA); Peter Wai-Tong Kwong, Vancouver (CA); Paul Terry, Vancouver (CA); Ronald Leonard Westfall, North Vancouver (CA)

(73) Assignee: Redback Networks Inc., San Jose, CA (US)

( * ) Notice: Subject to any disclaimer, the term of this patent is extended or adjusted under 35 U.S.C. 154(b) by 0 days.

(21) Appl. No.: 09/316,930

(22) Filed: May 21, 1999

Related U.S. Application Data

(60) Provisional application No. 60/118,156, filed on Feb. 1, 1999.

(51) Int. Cl.⁷ .............................................. H04L 12/56
(52) U.S. Cl. ................................. 370/395.42; 370/412
(58) Field of Search ........................ 370/395.21, 395.4, 370/395.42, 413, 415, 417

(56) References Cited

U.S. PATENT DOCUMENTS

| | | | |
|---|---|---|---|
| 4,736,363 A | | 4/1988 | Aubin et al. |
| 5,905,730 A | * | 5/1999 | Yang et al. ................. 370/235 |
| 5,923,656 A | * | 7/1999 | Duan et al. ............... 370/395.4 |
| 5,959,993 A | * | 9/1999 | Varma et al. ............... 370/397 |
| 5,999,534 A | * | 12/1999 | Kim ....................... 370/395.42 |
| 6,018,527 A | * | 1/2000 | Yin et al. .................... 455/115 |
| 6,075,791 A | | 6/2000 | Chiussi et al. |
| 6,088,734 A | * | 7/2000 | Marin et al. ................. 370/230 |
| 6,091,708 A | * | 7/2000 | Matsunuma ................ 370/233 |
| 6,134,217 A | * | 10/2000 | Stiliadis et al. ............. 370/232 |
| 6,188,698 B1 | * | 2/2001 | Galand et al. .............. 370/229 |
| 6,229,812 B1 | * | 5/2001 | Parruck et al. ........... 370/395.3 |
| 6,262,986 B1 | * | 7/2001 | Oba et al. .................... 370/399 |
| 6,407,999 B1 | * | 6/2002 | Olkkonen et al. .......... 370/229 |
| 6,408,006 B1 | * | 6/2002 | Wolff ..................... 370/395.42 |

FOREIGN PATENT DOCUMENTS

| | | |
|---|---|---|
| CA | PCT/CA00/00937 | 7/2002 |
| EP | 0859492 A2 | 8/1998 |
| WO | WO 98/23080 A | 5/1998 |
| WO | WO98/26510 | 6/1998 |
| WO | WO 9845976 | 10/1998 |
| WO | WO 00/08817 A | 2/2000 |
| WO | WO 00/11885 A | 3/2000 |
| WO | PCT/CA 00/00939 | 9/2001 |

OTHER PUBLICATIONS

Bennett, Jon C.R. and Hui Zhang. *Hierarchical Packet Fair Queueing Algorithms*. IEEE/ACM, Trans on Networking, 5(5), 1997.

International Search Report PCT/CA00/00937, 4 pages, Aug. 27, 2001.

Sally Floyd and Van Jacobson, "Link–Sharing and Resource Management Models for Packet Networks," IEEE/ACM Transactions on Networking, vol. 3, No. 4, pp. 365–386, Aug., 1995.

\* cited by examiner

*Primary Examiner*—Hassan Kizou
*Assistant Examiner*—D L Levitan
(74) *Attorney, Agent, or Firm*—Blakely Sokoloff Taylor & Zafman LLP

(57) ABSTRACT

Providing different levels of quality of service for different data flows being transported over a data link requires a very fast way to schedule individual packets for forwarding on the data link. The invention provides scheduling methods which give preference to higher priority packets while treating lower priority packets fairly. The methods can provide shorter latencies for higher priority packets than can many prior scheduling methods. The methods and apparatus of the invention are readily adaptable for use with scheduling rules provided in the form of hierarchical policy trees.

37 Claims, 10 Drawing Sheets

PACKET SCHEDULING METHODS AND APPARATUS

CROSS REFERENCE TO RELATED APPLICATIONS

This application claims priority from U.S. provisional application No. 60/118,156 filed Feb. 1, 1999 which is entitled PACKET CLASSIFICATION METHODS AND APPARATUS, METHODS AND APPARATUS FOR DEPLOYING QUALITY OF SERVICE POLICIES ON A DATA COMMUNICATION NETWORK AND PACKET SCHEDULING METHODS AND APPARATUS.

FIELD OF THE INVENTION

This invention relates to the transmission of data over communications networks including wide area networks. More specifically, this invention relates to methods and apparatus for scheduling data packets for transmission over a data link. The scheduling methods and apparatus may be used in systems for providing a plurality of differentiated services each providing a different level of Quality of Service ("QoS") over wide area networks. The scheduling methods and apparatus have particular application in Internet Protocol ("IP") networks.

BACKGROUND OF THE INVENTION

Maintaining efficient flow of information over data communication networks is becoming increasingly important in today's economy. Telecommunications networks are evolving toward a connectionless model from a model whereby the networks provide end-to-end connections between specific points. In a network which establishes specific end-to-end connections to service the needs of individual applications the individual connections can be tailored to provide a desired bandwidth for communications between the end points of the connections. This is not possible in a connectionless network. The connectionless model is desirable because it saves the overhead implicit in setting up connections between pairs of endpoints and also provides opportunities for making more efficient use of the network infrastructure through statistical gains. Many networks today provide connectionless routing of data packets, such as Internet Protocol ("IP") data packets over a network which includes end-to-end connections for carrying data packets between certain parts of the network. The end-to-end connections may be provided by technologies such as Asynchronous Transfer Mode ("ATM"), Time Division Multiplexing ("TDM") and SONET/SDH.

A Wide Area Network ("WAN") is an example of a network in which the methods of the invention may be applied. WANs are used to provide interconnections capable of carrying many different types of data between geographically separated nodes. For example, the same WAN may be used to transmit video images, voice conversations, e-mail messages, data to and from database servers, and so on. Some of these services place different requirements on the WAN.

For example, transmitting a video signal for a video conference requires fairly large bandwidth, short delay (or "latency"), small delay jitter, and reasonably small data loss ratio. On the other hand, transmitting e-mail messages or application data can generally be done with lower bandwidth but can tolerate no data loss. Further, it is not usually critical that e-mail be delivered instantly. E-mail services can usually tolerate longer latencies and lower bandwidth than other services.

A typical WAN comprises a shared network which is connected by access links to two or more geographically separated customer premises. Each of the customer premises may include one or more devices connected to the network. More typically each customer premise has a number of computers connected to a local area network ("LAN"). The LAN is connected to the WAN access link at a service point. The service point is generally at a "demarcation" unit or "interface device" which collects data packets from the LAN which are destined for transmission over the WAN and sends those packets across the access link. The demarcation unit also receives data packets coming from the WAN across the access link and forwards those data packets to destinations on the LAN.

Currently an enterprise which wishes to link its operations by a WAN obtains an unallocated pool of bandwidth for use in carrying data over the WAN. While it is possible to vary the amount of bandwidth available in the pool (by purchasing more bandwidth on an as-needed basis), there is no control over how much of the available bandwidth is taken by each application.

As noted above, guaranteeing the Quality of Service ("QoS") needed by applications which require low latency is typically done by dedicating end-to-end connection-oriented links to each application. This tends to result in an inefficient allocation of bandwidth. Network resources which are committed to a specific link are not readily shared, even if there are times when the link is not using all of the resources which have been allocated to it. Thus committing resources to specific end-to-end links reduces or eliminates the ability to achieve statistical gains. Statistical gains arise from the fact that it is very unlikely that every application on a network will be generating a maximum amount of network traffic at the same time.

If applications are not provided with dedicated end-to-end connections but share bandwidth then each application can, in theory, share equally in the available bandwidth. In practice, however, the amount of bandwidth available to each application depends on things such as router configuration, the location(s) where data for each application enters the network, the speeds at which the application can generate the data that it wishes to transmit on the network and so on. The result is that bandwidth may be allocated in a manner that bears no relationship to the requirements of individual applications or to the relative importance of the applications. There are similar inequities in the latencies in the delivery of data packets over the network.

The term Quality of Service is used in various different ways by different authors. In general, QoS refers to a set of parameters which describe the required traffic characteristics of a data connection. In this specification the term QoS refers to a set of one or more of the following interrelated parameters which describe the way that a data connection treats data packets generated by an application:

Minimum Bandwidth—a minimum rate at which a data connection must be capable of forwarding data originating from the application. The data connection might be incapable of forwarding data at a rate faster than the minimum bandwidth but should always be capable of forwarding data at a rate equal to the rate specified by the minimum bandwidth;

Maximum Delay—a maximum time taken for data from an application to completely traverse the data connection. QoS requirements are met only if data packets traverse the data connection in a time equal to or shorter than the maximum delay;

Maximum Loss—a maximum fraction of data packets from the application which may not be successfully transmitted across the data connection; and, Jitter—a measure of how much variation there is in the delay experienced by different packets from the application being transmitted across the data connection. In an ideal case, where all packets take exactly the same amount of time to traverse the data connection, the jitter is zero. Jitter may be defined, for example, as any one of various statistical measures of the width of a distribution function which expresses the probability that a packet will experience a particular delay in traversing the data connection. Different applications require different levels of QoS.

Recent developments in core switches for WANs have made it possible to construct WANs capable of quickly and efficiently transmitting vast amounts of data. There is a need for a way to provide network users with control over the QoS provided to different data services which may be provided over the same network.

Service providers who provide access to WANs wish to provide their customers with Service Level Agreements rather than raw bandwidth. This will permit the service providers to take advantage of statistical gain to more efficiently use the network infrastructure while maintaining levels of QoS that customers require. To do this, the service providers need a way to manage and track usage of these different services. There is a particular need for relatively inexpensive apparatus and methods for facilitating the provision of services which take advantage of different levels of QoS.

Applications connected to a network generate packets of data for transmission on the network. In providing different levels of service it is necessary to be able to sort or "classify" data packets from one or more applications into different classes which will be accorded different levels of service. The data packets can then be transmitted in a way which maintains the required QoS for each application. Data packets generated by one or more applications may belong to the same class.

There are many known methods for scheduling the transmission of packets over a data link. These include simple round robin schemes, Class-Based Queuing (CBQ), Worst Case Weighted Fair Queuing (WF2Q) and Worst Case Weighted Fair Queuing+(WF$^2$Q+). All of these methods have disadvantages. CBQ, WF2Q and WF2Q+ all introduce undesirably long queuing delays. A problem with many of these scheduling protocols is that they introduce too much delay into the transmission of those packets which must be delivered with minimum latency.

There is a need for a fast scheduling method and apparatus which can transmit "real time" packets with very small delays but which can also schedule the transmission of non-real time packets fairly.

SUMMARY OF THE INVENTION

This invention provides methods and apparatus for scheduling the forwarding of data packets over a data link. The methods of the invention involve receiving classified data packets. In one embodiment of the invention, the methods include selecting one of a plurality of data packets by selecting an eligible group of data packets and determining whether data packets in the eligible group all belong to classes having the same priority or belong to classes having different priorities. If the data packets in the eligible group belong to two or more classes having different priorities the method selects one data packet by applying a selection criterion to an eligible sub-group containing those one or more data packets in the eligible group which belong to classes having a highest priority. If the data packets in the eligible group all belong to classes having the same priority, the method selects one data packet by applying a selection criterion to all data packets in the eligible group. The method provides reduced queuing delays for packets belonging to higher priority classes.

In preferred embodiments the selection criterion comprises a first to finish selection criterion. The method preferably includes maintaining a virtual time value. Selecting the eligible group preferably comprises selecting packets having a start time less than or equal to the virtual time value.

The invention may be practised with a plurality of scheduling engines interlinked to form a hierarchical tree, the tree including at least a parent scheduling engine and a plurality of child scheduling engines linked to the parent scheduling engine. The parent scheduling engine selects one data packet from the data packets being held by the child scheduling engines. In some embodiments, whenever a data packet belonging to a high priority class becomes available for selection by a child scheduling engine and a data packet already selected and being held by that child scheduling engine belongs to a lower priority class, the data packet belonging to the high priority class is made available for selection by the parent scheduling engine in place of the already selected data packet.

The invention also provides apparatus for scheduling transmission of data packets on a data link, the apparatus comprises:

a) a memory capable of holding a plurality of data packets queued in a plurality of queues;

b) means for keeping a start time, a finish time and a priority for a packet at a head of each of the queues;

c) a scheduling engine adapted to select one packet from a plurality of packets at the heads of the queues, the scheduling engine comprising:

i) a counter for maintaining a virtual time for the scheduling engine;

ii) means for comparing the start time for each packet to the virtual time for the scheduling engine to select an eligible group of packets;

iii) means for comparing the priorities of packets in the eligible group of packets and eliminating from the eligible group packets having a priority lower than a priority for another packet in the eligible group; and, iv) means for selecting one packet from the eligible group having an earliest finish time.

Other aspects and features of the invention are described below.

BRIEF DESCRIPTION OF THE DRAWINGS

In the attached drawings which illustrate non-limiting embodiments of the invention.

DETAILED DESCRIPTION

This invention may be applied in many different situations where data packets are scheduled and dispatched. The following description discusses the application of the invention to scheduling onward transmission of data packets received at an Enterprise Service Point ("ESP"). The invention is not limited to use in connection with ESP devices but can be applied in almost any situation where classified data packets are scheduled and dispatched.

Figure 1:
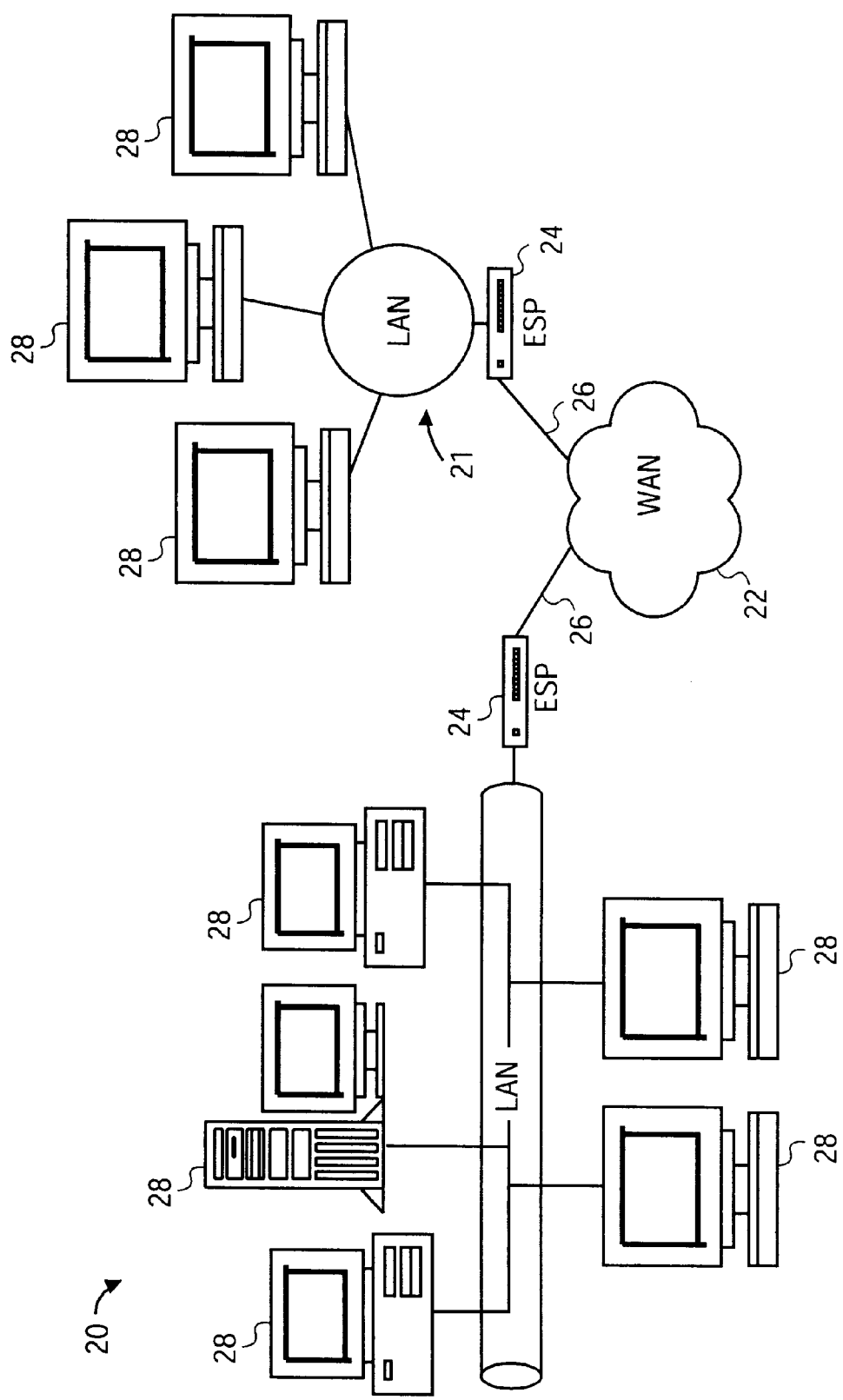
FIG. 1 is a schematic view of a wide area network according to the invention which comprises enterprise service point ("ESP") devices for providing packet scheduling functions according to the invention.

FIG. 1 shows a generalized view of a pair of LANs 20, 21 connected by a WAN 22. Each LAN 20, 21 has an Enterprise Service Point unit ("ESP") 24 which connects LANs 20, 21 to WAN 22 via an access link 26. LAN 20 may, for example, be an Ethernet network or a token ring network. Access link 26 may, for example, be an Asynchronous Transfer Mode ("ATM") link. Each LAN has a number of connected devices 28 which are capable of generating and/or receiving data for transmission on the LAN. Devices 28 typically include network connected computers.

Figure 2:
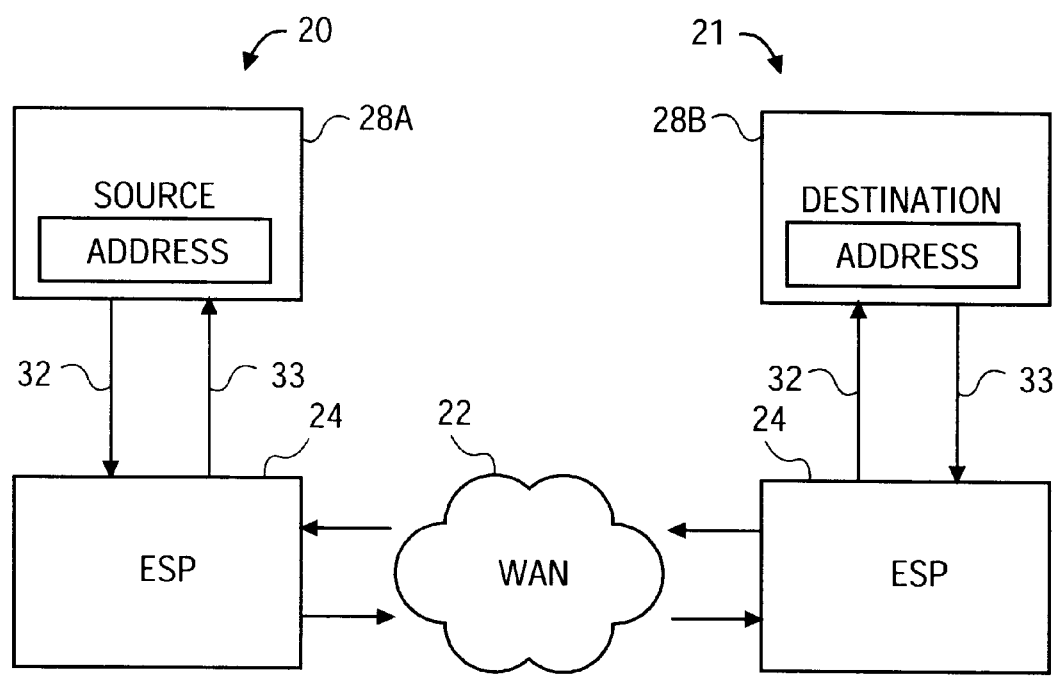
FIG. 2 is a schematic view illustrating two flows in a communications network according to the invention.

As required, various devices 28 on network 20 may establish connections with devices 28 on network 21 and vice versa. Each connection may be called a session. Each session comprises one or more flows. Each flow is a stream of data from a particular source to a particular destination. For example, FIG. 2 illustrates a session between a computer 28A on network 20 and a computer 28B on network 21. The session comprises two flows 32 and 33. Flow 32 originates at computer 28A and goes to computer 28B through WAN 22. Flow 33 originates at computer 28B and goes to computer 28A over WAN 22. Computers 28A and 28B each have an address. Most typically data in a great number of flows will pass through each ESP 24 in any short period.

Each flow consists of a series of data packets. In general the data packets may have different sizes. Each packet comprises a header portion which contains information about the packet and a payload or datagram. For example, the packets may be Internet protocol ("IP") packets.

Figure 3:
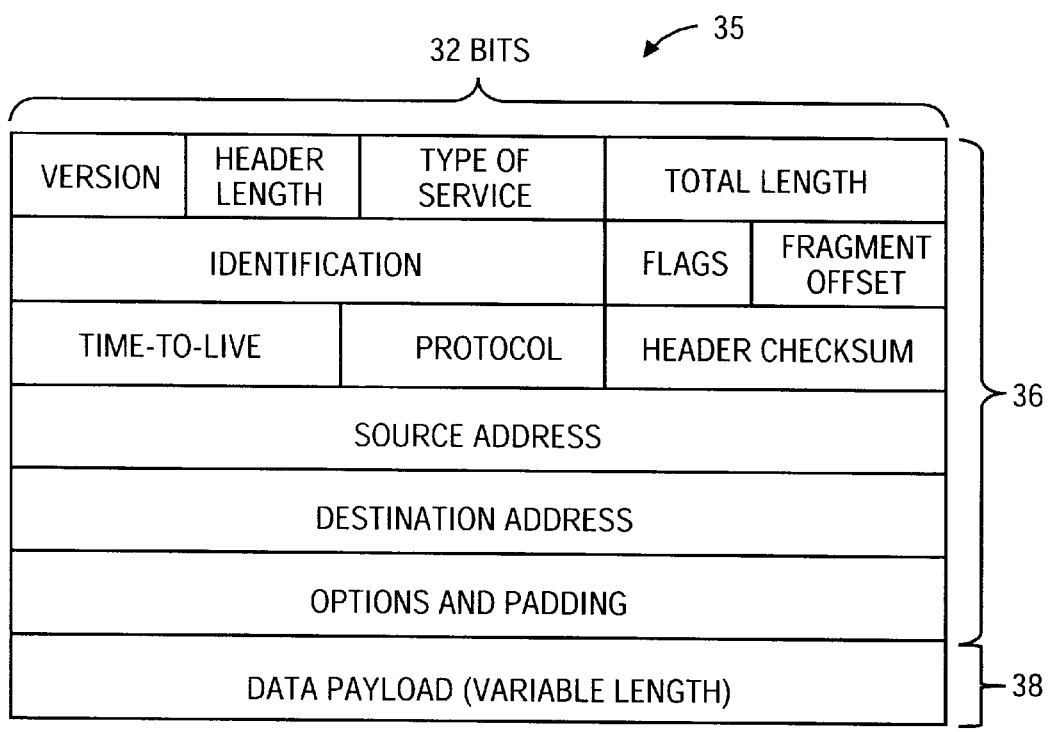
FIG. 3 is a diagram illustrating the various data fields in a prior art IP data packet.

FIG. 3 illustrates the format of an IP packet 35 according to the currently implemented IP version 4. Packet 35 has a header 36 and a data payload 38. The header contains several fields. The "version" field contains an integer which identifies the version of IP being used. The current IP version is version 4. The "header length" field contains an integer which indicates the length of header 36 in 32 bit words. The "type of service" field contains a number which can be used to indicate a level of Quality of Service required by the packet. The "total length" field specifies the total length of packet 35. The "identification" field contains a number which identifies the data in payload 38. The "flags" field contains 3 bits which are used to determine whether the packet can be fragmented. The "time-to-live" field contains a number which is decremented as the packet is forwarded. When this number reaches zero the packet may be discarded. The "protocol" field indicates which upper layer protocol applies to packet 35. The "header checksum" field contains a checksum which can be used to verify the integrity of header 36. The "source address" field contains the IP address of the sending node. The "destination address" field contains the IP address of the destination node. The "options" field may contain information related to packet 35.

Each ESP 24 receives streams of packets from its associated LAN and from WAN 22. These packets typically belong to at least several different flows. The combined bandwidth of the input ports of an ESP 24 is typically greater than the bandwidth of any single output port of ESP 24. Therefore, ESP 24 typically represents a queuing point where packets belonging to various flows may become backlogged while waiting to be transmitted through a port of ESP 24. Backlogs may occur at any output port of ESP 24. While this invention is preferably used to manage the scheduling of packets at all output ports of ESP 24, the invention could be used at any one or more output ports of ESP 24.

For example, if the output port which connects ESP 24 to WAN 22 is backlogged then ESP 24 must determine which packets to send over access link 26, in which order, to make the best use of the bandwidth available in access link 26 and to provide guaranteed levels of service to individual flows. To do this, ESP 24 must be able to classify each packet, as it arrives, according to certain rules. ESP 24 can then identify those packets which are to be given priority access to link 26. After the packets are classified they can be scheduled for transmission.

The packets must be classified, scheduled and forwarded extremely quickly. For example, a delay of much more than 1 millisecond is unacceptable for two-way voice conversations. If classifying and scheduling a packet takes 2 milliseconds then it would be impossible to provide a QoS sufficient for two-way voice conversations. This invention provides methods and apparatus for scheduling the transmission of packets for transmission over a data connection in a data communication network. By way of example only, packets transmitted via the data connection may be carried over an ATM link.

Incoming packets are sorted by a classifier into classes according to a policy which includes a set of classification rules. The rules set conditions on the values of one or more parameters which characterize the packets which belong to each class. A packet is assigned to a class if the parameter values for that packet match the conditions set by the classification rules for the class. The policy also establishes a QoS level which will be accorded to the packets in each of the different classes. Data packets in some classes may be treated differently from data packets in other classes to provide guaranteed levels of QoS to applications which generate data packets in selected classes.

There is preferably a separate policy for each output port of ESP 24. For example, There is a policy for the port of ESP 24 connected to outgoing link 26. There may be separate policies classifying and scheduling packets which are received at an ESP 24 from a data link 26 and which are destined for each one of the one or more ports of ESP 24 connected to a LAN. The methods and apparatus of the invention may also be used in other network devices which schedule the forwarding of data packets.

Any suitable classifier may be used to classify data packets for scheduling according to this invention. For example, the classification methods and apparatus described in a co-pending commonly owned application entitled METHODS AND APPARATUS FOR PACKET CLASSIFICATION WITH MULTI-LEVEL DATA STRUCTURE which is incorporated herein by reference, or the methods and apparatus described in METHODS AND APPARATUS FOR PACKET CLASSIFICATION WITH MULTIPLE ANSWER SETS which is incorporated herein by reference, may be used to classify packets so that the packets may be scheduled by the methods and apparatus of this invention.

Figure 4:
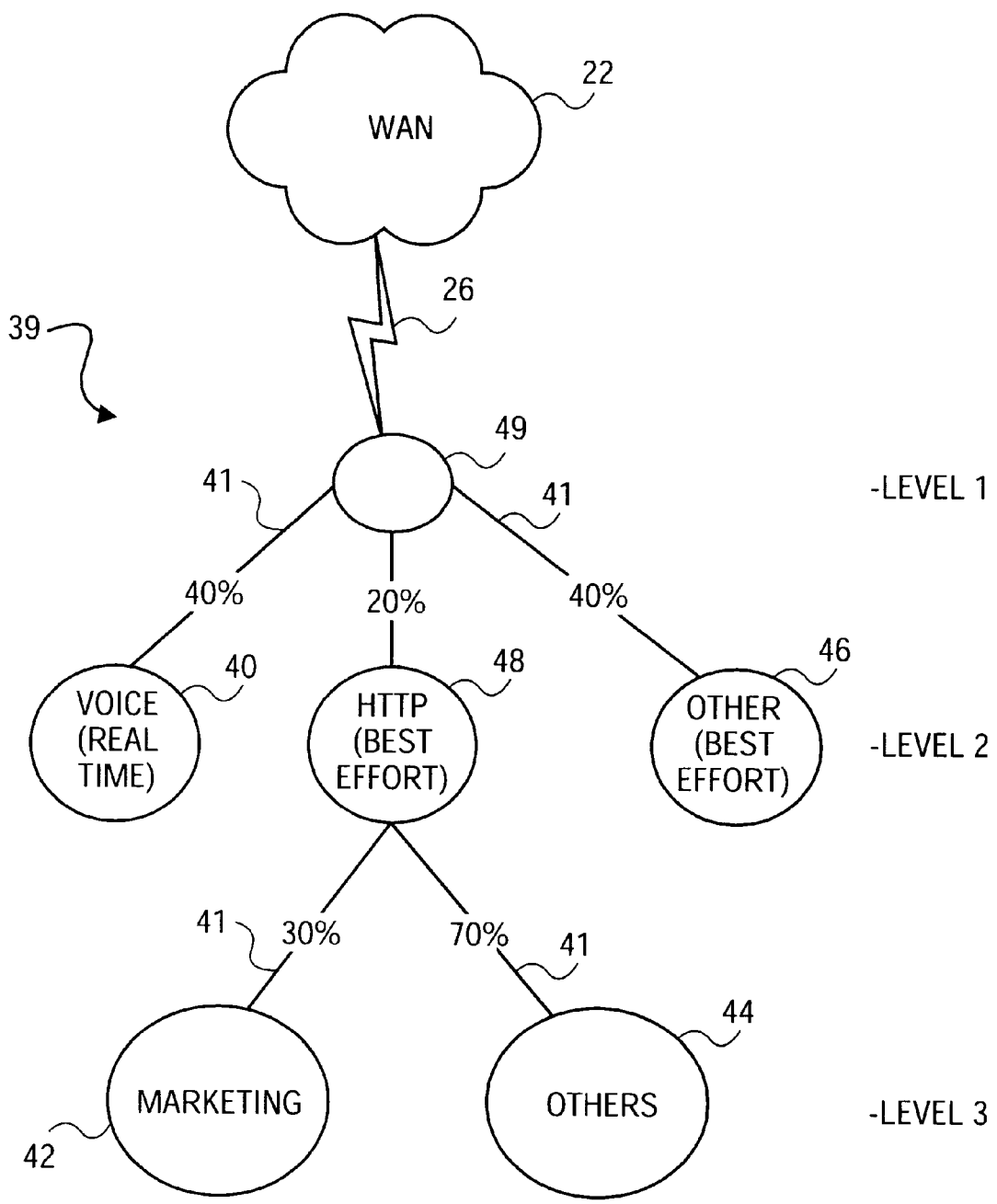
FIG. 4 is a schematic view showing an example a policy which may be implemented with the methods and apparatus of the invention.

At any given time ESP 24 may hold backlogged data packets which are waiting to be forwarded to a destination and which are classified in one or more of the classes. The relationship between different classes in a policy and the QoS accorded to different classes may be represented by a "classification tree" or "policy" tree 39 (FIG. 4). The leaf nodes of one or more policy trees 39 correspond to the individual classes identified by the classification rules of the policy. Other nodes of the policy tree may also be called classes.

FIG. 4 schematically illustrates one possible policy tree 39. Policy tree 39 has a number of leaf nodes 40, 42, 44, 46. In the example policy tree of FIG. 4 class 40 contains voice traffic. Class 40 may be termed a "real time" class because it is important to deliver packets in class 40 quickly enough to allow a real time voice conversation between two people. Packets in class 40 will be scheduled so that each flow in class 40 will be guaranteed sufficient bandwidth to support a real time voice session. This may be done, for example, by specifying a particular minimum amount of bandwidth to be shared by the packets classified in class 40. Each flow in class 40 will be guaranteed a level of QoS sufficient for voice communication.

Classes 42 and 44 contain flows of Hyper Text Transfer Protocol ("HTTP") packets. Class 42 contains HTTP flows which originate in MARKETING. MARKETING may be, for example, sources 28 associated with a company's marketing department. Other HTTP flows fall into class 44. As indicated at 48, in the policy of FIG. 4, classes 42 and 44 will share between themselves at least 40% of the bandwidth. 15% of the bandwidth is allocated to satisfy the flows of class 40. The other 45% of the bandwidth is allocated to class 46 which covers all other flows. Of the bandwidth shared by classes 42 and 44, at least 30% is allocated to class 42 and at least 70% is allocated to class 44. The actual bandwidth available at a node may be greater than the minimum bandwidth allocated by policy 39. For example, packets coming through node 42 may enjoy more than 30% of the bandwidth of node 48 which is shared between nodes 42 and 44 if there is no backlog of packets at node 44 (i.e. node 44 is not using all of the minimum bandwidth to which it is entitled). If, for example, at some time there are no packets for transmission which are associated with node 44 then all of the bandwidth shared by nodes 42 and 44 is available to packets associated with node 42.

A policy tree typically has two or more levels. The policy tree 39 of FIG. 4 has 3 levels. Nodes which are in the same level are all separated from link 26 by the same number of nodes above them in policy tree 39. We can refer to the levels in increasing ordinality starting from node 49 which can be termed a first level, or "root" level node. Nodes 40, 46 and 48 may be termed "second" level nodes because they are one node removed from link 26. Nodes 42 and 44 are third level nodes which are two nodes removed from link 26, and so on.

In FIG. 4 lower level nodes of policy tree 39 are depicted as being above higher level nodes. Nodes in policy tree 39 are connected to one another as indicated in FIG. 2 by lines 41. A higher level node connected to a lower level node by a line 41 is said to be a child of the higher level node. A lower level node connected to a higher level node by a line 41 is said to be a parent of the lower level node.

The policy represented by a policy tree 39 may specify QoS by providing a desired distribution of bandwidth between different higher level nodes which depend from the same lower level node. This may be done, for example, by specifying absolute amounts of bandwidth to be provided to individual higher level nodes, specifying percentages of available bandwidth to be shared by each of two or more higher level nodes (as described above with respect to nodes 42 and 44), a combination of these measures or any equivalent measure.

In preferred embodiments of the invention, packets are classified and inserted into a scheduler which has a structure mirroring that of the policy tree. The packets enter the scheduler at a leaf node corresponding to the class. From there, the packets "percolate" from node to node up through the scheduler, until they reach a node corresponding to the root node of the policy tree. From there, the packets are sent out on the data link.

Figure 5:
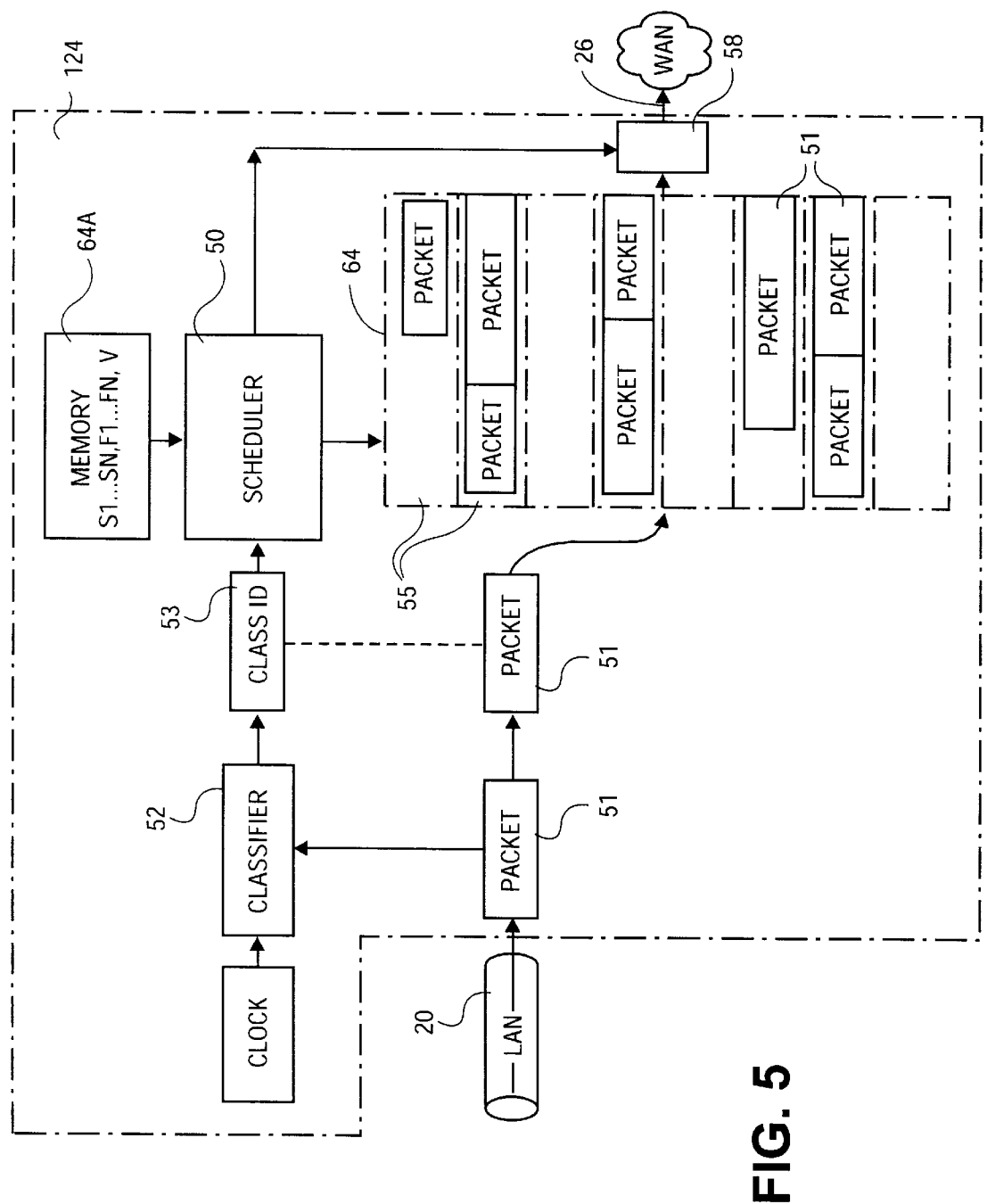
FIG. 5 is a schematic view of apparatus for scheduling packets according to the invention.

After a packet has been classified then the classification information for the packet is forwarded to a scheduler 50 (FIG. 5). Scheduler 50 schedules the transmission of the packet out an output port. Scheduler 50 uses the policy associated with the port to determine the sequence in which to send any packets which are backlogged waiting to be sent through the output port.

Figure 6:
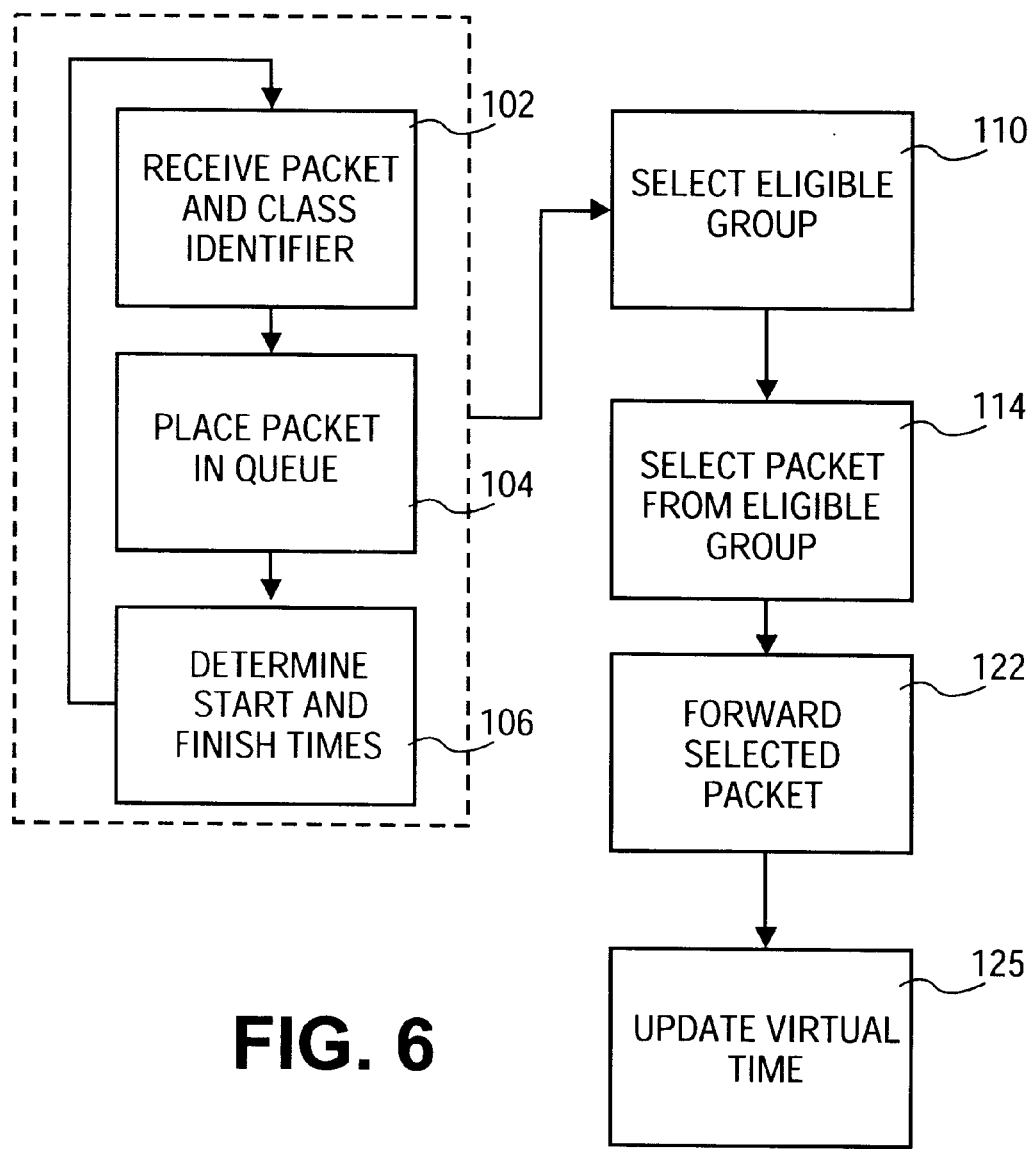
FIG. 6 is a flow chart illustrating a method according to the invention by which leaf scheduling engines may select and transmit packets.

As shown in FIGS. 5 and 6, a scheduler 50 receives each incoming packet 51 together with a class identifier 53 generated by a classifier 52 (step 102). Scheduler 50 then places each packet in a queue 55 (step 104). Each queue 55 is associated with a leaf class. The particular queue 55 into which a packet is inserted is determined by the classification of the packet and, possibly, by the flow to which the packet belongs. Each queue 55 may contain zero, one, or more packets. Each active flow may have its own queue or, in the alternative, the packets for two or more flows may all be directed to a single queue.

Queues 55 do not need to be physical queues in the sense that all packets in each queue 55 are located in sequence in the same storage device. Queues 55 are logical first in, first out ("FIFO") queues. Packets 51 are stored somewhere in a storage device accessible to scheduler 50. In FIG. 5, the packets are stored in an RAM memory 64 accessible to scheduler 50. Scheduler 50 maintains a record of what packets 51 belong to each queue 55 and what is the order of packets 51 within each queue 55.

Scheduler 50 selects packets which are at the heads of their respective queues 55 and a forwarder 58 associated with scheduler 50 sequentially transmits the selected packets over a data link 26. As is known in the art, data link 26 may include an adaptation layer. Each packet 51 may be transmitted on data link 26 as one or more data packets of the type carried by data link 26.

Figure 5A:
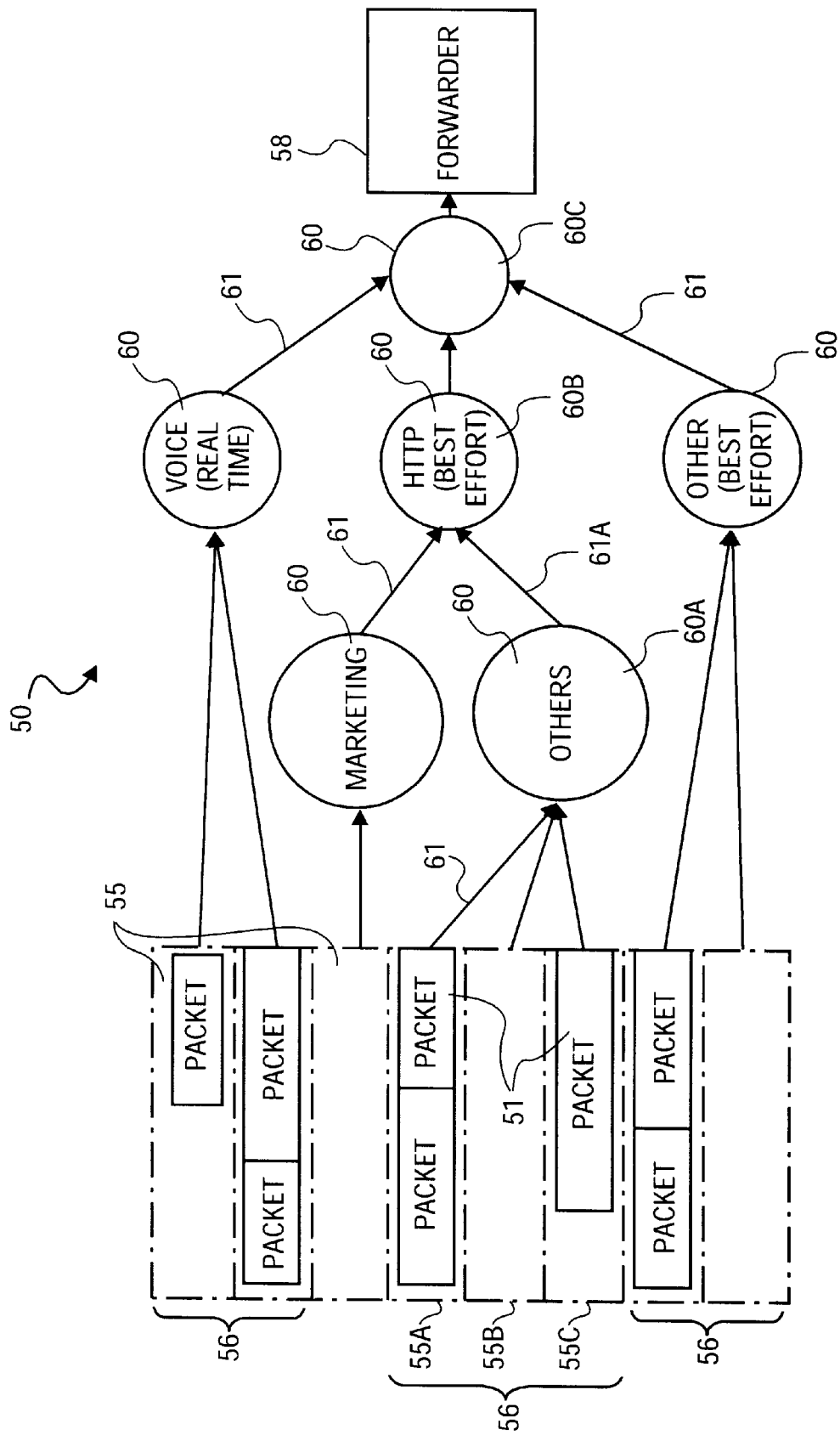
FIG. 5A is a schematic illustration showing a structure of a scheduler according to the invention.

As shown in FIG. 5A, the scheduler 50 of this invention preferably has a structure which mirrors that of a policy tree 39. Scheduler 50 has a scheduling engine 60 corresponding to each node of policy tree 39. The scheduling engines 60 are connected by data pathways 61 which permit one scheduling engine to forward data packets to its parent scheduling engine. It is not necessary for data packets 51 to be physically transmitted from one scheduling engine 60 to another. It is only necessary for information identifying individual data packets 51 to be sent from one scheduling engine 60 to another. The data packet 51 in question could continue to reside in the same location in a storage device, such as RAM 64, until it is forwarded by forwarder 58.

Each group 56 of queues 55 corresponds to a leaf class in the policy tree 39. A scheduling engine 60 corresponding to each leaf node (a "leaf scheduling engine") selects packets from the queue(s) 55 in the group 56 corresponding to the same leaf node for passing to the scheduling engine 60 corresponding to the parent of the leaf node (a "parent scheduling engine"). For example, leaf scheduling engine 60A selects packets from the group 56 consisting of queues 55A, 55B, and 55C to be passed to parent scheduling engine 60B along data path 61A. A child scheduling engine 60 corresponding to a first node of a policy tree 39 can pass responsibility for data packets 51 to a parent scheduling engine 60 which corresponds to the parent node of the first node of the policy tree. A parent scheduling engine corresponding to a first node of a policy tree can receive data packets 51 from one or more child scheduling engines which correspond to child nodes of the first node of the policy tree. A scheduling engine 60 may be a child of another scheduling engine 60 and, at the same time, may be a parent of one or more other scheduling engines 60.

Scheduler 50 passes responsibility for each packet 51 from one scheduling engine 60 to another upwards through the tree in stages until the packet 51 is associated with scheduling engine 60C which corresponds to the first level node 49 of policy tree 39. The scheduling engine 60C associated with the first level node 49 of policy tree 39 selects packets from its child scheduling engines to be sent out the logical output port by forwarder 58.

Each scheduling engine 60 can pass one packet at time to its parent (lower level) scheduling engine. A scheduling engine 60 which receives packets from more than one source (e.g. which corresponds to a node in a policy tree which has two or more child nodes or which corresponds to a leaf node having a plurality of corresponding queues) interleaves packets from the different sources so that all packets 51 will eventually be passed by the scheduling engine 60.

Packets 51 are transmitted through a scheduling engine 60 at a rate R that corresponds to the bandwidth assigned to the scheduling engine in policy tree 39. The bandwidth assigned to a parent scheduling engine 60 must be equal to the aggregate bandwidth allocated to the child scheduling engines 60 of that parent scheduling engine.

The bandwidth assigned to a leaf scheduling engine 60 is shared equally by all queues associated with the leaf scheduling engine. Each queue is assigned a bandwidth $R_q$ of:

$$R_q = \frac{R_{lc}}{N_q} \tag{1}$$

where $R_{lc}$ is the bandwidth for the leaf class and $N_q$ is the number of queues associated with the leaf class.

In general, the packets in different queues 55 will not be equal in length. Therefore, a leaf scheduling engine 60 cannot fairly allocate bandwidth by simply transmitting one or more packets 51 from each active queue 55 with the number of packets 51 transmitted from each queue in a ratio equal to the proportion of bandwidth available for each one of the active queues.

In the preferred embodiment of the invention, a notion of time is used to measure whether packets are being trans-mitted at an assigned rate. If a packet 51 of length L were transmitted at a rate R, its transmission will be completed after an interval I given by:

$$I = L/R \tag{2}$$

Each scheduling engine 60 maintains a virtual time V which advances by the interval I each time it passes a packet to its parent scheduling engine (or to forwarder 58 in the case of scheduling engine 60C). Each interval is calculated from the length of the packet being passed. The virtual time of each scheduling engine 60 is initialized to 0 when scheduler 50 is initialized. The virtual time of each scheduling engine 60 is stored in an associated memory 64A as shown in FIG. 5.

The packets in a queue 55 associated with a leaf class of tree 39 should ideally be transmitted out of the queue 55 at the rate given by Equation (1). In a preferred implementation of scheduler 50, each leaf scheduling engine 60 calculates a start time S and a finish time F for packets 51 at the heads of its queues 55 (step 106). The start and finish times for a packet can be considered to be measures of when a packet 51 at the head of a queue 55 should ideally start to be transmitted and when it should finish transmission. S and F are used by leaf scheduling engines 60 to select which packet to transmit next.

When a packet 51 first reaches the head of a queue 55, it is assigned a start time S and a finish time F. A packet 51 can reach the head of a queue 55 by being placed into an empty queue 55. In this case the packet 51 is assigned the virtual time of the leaf scheduler 60 to which the queue belongs as its start time. The other way a packet 51 can reach the head of a queue 55 is for it to replace a previous packet 51 that has just been transmitted out of the queue. In this case the start time of the packet 51 will be set to the finish time of the previous packet 51. When the start time for a packet 51 is known then the finish time for the packet 51 will be given by the equation:

$$F_i = S_i + \left\{ \frac{L_i}{R_{lc} \div N_q} \right\} \tag{3}$$

Scheduler 50 keeps a record of V for each scheduling engine 60 and also keeps records of S and F for the packets at the head of each non-empty queue 55 managed by scheduler 50. In the embodiment of FIG. 5, this information is kept in an associated memory 64A. While S, F and V have been called "times" these parameters do not necessarily bear any relationship to actual time. S, F and V are similar to time in that they always increase. In commercial embodiments, S F and V will typically be values stored in memory locations. The values are periodically added to by scheduler 50.

As noted above, start times S and finish times F for each queue are calculated on the basis of the rate Rlc/Nq. However, leaf schedulers 60 extract packets from queues 55 and forward those extracted packets at a rate Rlc. The virtual time V for the leaf scheduler 60 is advanced on the basis of the rate Rlc. This means that the values of S and F for a packet at the head of a queue 55 will tend to be in the future relative to the virtual time V of the associated leaf scheduling engine 60. This gives the leaf scheduling engine 60 time to service any other queues 55. In other words, start times S and finish times F are based on a portion of the rate $(R_{lc})$–$R_{lc}/N_q$ (based on the number of queues associated with this given leaf. In contrast, the virtual time V of the associated leaf scheduling engine 60 is based on the rate $(R_{lc})$.

Where a leaf scheduling engine 60 services more than one queue, the leaf scheduling engine 60 selects a next packet to be transmitted by using the start and finish times of the packets at the heads of the queues 55 associated with the leaf class. According to the preferred embodiment of the invention, each leaf scheduling engine 60 selects a group of eligible packets 51 from the group of all packets 51 at the heads of the queues 55 in the group 56 associated with that leaf scheduling engine 60 (step 110). A leaf scheduling engine 60 selects the packets 51 at the heads of the queues 55 in the group 56 associated with that leaf scheduling engine 60. From these selected packets 51, the leaf scheduling engine 60 selects a group of eligible packets 51. The eligible group comprises a set of packets which are eligible for transmission according to an eligibility criterion. Preferably the set of eligible packets is constructed by selecting those packets which have a start time S smaller than or equal to the virtual time V of the scheduler 60.

When this eligibility criterion is used, the eligible packets are packets whose predicted start times have passed. If the scheduling engine 60 does not send a packet 51 from that queue 55 soon, the queue 55 will not have the benefit of the bandwidth calculated by equation (1). If a packet 51 at the head of a queue 55 is not eligible, its start time is greater than the virtual time V of the scheduling engine 60. This indicates that the queue 55 has already received the benefit of its assigned bandwidth.

If there are no eligible packets in any queue 55 associated with a leaf class (i.e. the set of eligible packets is empty), but there are packets in one or more of the queues 55 associated with the leaf class, then the virtual time V of the scheduling engine 60 associated with the leaf class is advanced to the start time S of the packet or packets with the earliest start time S. A set of eligible packets is then identified by applying the eligibility criteria to the packets using the new virtual time V (step 110).

In preferred embodiments of the invention, the leaf scheduling engine 60 will select for transmission the eligible packet 51 which meets a selection criterion (step 114). Preferably the selection criterion is a first to finish selection criterion so that the eligible packet that has the earliest finish time F is selected. An alternative, less preferable, approach is to use a selection criterion which selects for transmission the eligible packet with the earliest start time S. If two or more packets have the same finish time (or start time), scheduling engine 60 may select one of the two or more packets at random (step 114).

A simplified method is possible whereby leaf scheduling engine 60 simply selects for transmission the packet which has the smallest finish time F (or earliest start time S) without considering eligibility. The use of only finish time (or start time) provides coarse-grained control over bandwidth usage, but there will be short term fluctuations either side of the assigned bandwidth.

After leaf scheduling engine 60 selects a packet 51, the selected packet 51 is removed from its queue 55 and is held at leaf scheduling engine 60. In preferred embodiments of the invention only a single packet 51 can be held at a scheduling engine 60. Once again, it is not necessary for the packet 51 to be physically moved. Eventually the selected packet will be passed to the parent of the leaf scheduling engine 60 (step 122). At that time, the virtual time V of the leaf scheduling engine 60 will be updated (step 125) and leaf scheduling engine 60 will select a new packet 51 (step 114) from a queue 55 for eventual transmission.

Figure 6A:
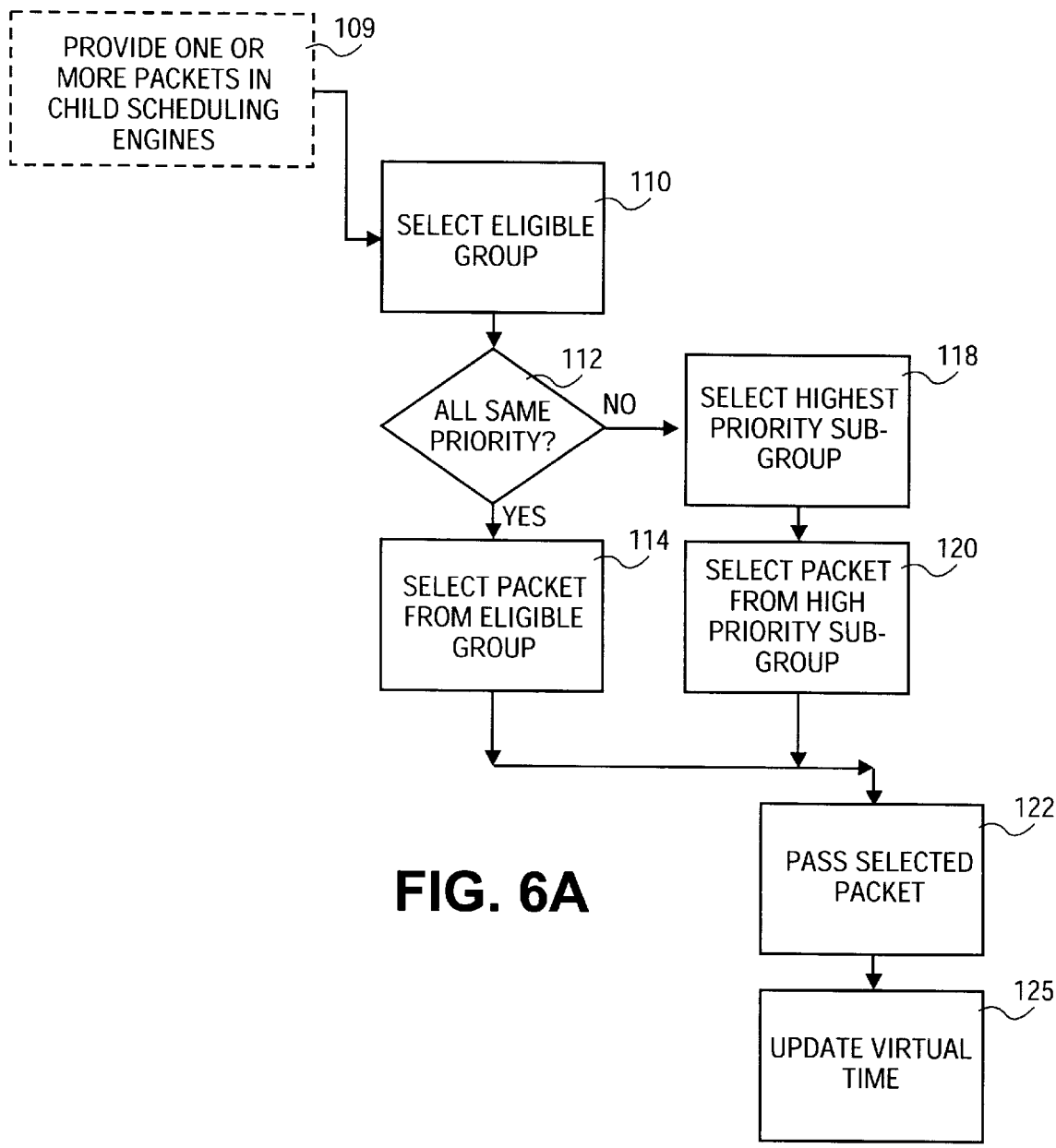
FIG. 6A is a flow chart illustrating a method according to the invention by which non-leaf scheduling engines may select and transmit packets.

In the preferred embodiment of the invention, scheduling engines 60 corresponding to non-leaf classes use a similar method to select a packet for transmission as shown in FIG. 6A. Each scheduling engine 60 which corresponds to a non-leaf class selects packets 51 from among those packets 51 which are being held by its child scheduling engine(s) 60 (step 109).

In a preferred implementation of the invention, each child scheduling engine 60 assigns new start and finish times to a packet 51 when the packet is transferred to the child scheduling engine 60. If a child scheduling engine 60 passes a packet to its parent scheduling engine 60 and immediately receives a new packet 51 in the same operation then the new packet 51 is assigned a start time that is the same as the finish time of the previously passed packet. Otherwise, the virtual time of the child scheduling engine 60 is set equal to that of the parent scheduling engine 60 and the new packet 51 is assigned a start time equal to the newly assigned virtual time V of the child scheduling engine 60.

First level scheduling engine 60C has no parent scheduling engine 60. Scheduling engine 60C does not need to maintain start and finish times for the packet that it is holding because forwarder 58 simply forwards the packets held by scheduling engine 60C as quickly as possible.

The finish time for a packet 51 being held at a child scheduling engine 60 will be given by the equation:

$$F_i = S_i + \left\{\frac{L_i}{R_{cc}}\right\} \tag{4}$$

Where $R_{cc}$ is the data rate assigned to the child scheduling engine in policy tree 39. The start and finish times of packets 51 held at all scheduling engines 60 are stored in associated memory 64A.

Start and finish times for a packet 51 being held at a child scheduling engine 60 are calculated on the basis of the rate $R_{cc}$. A parent scheduling engine 60 is assigned a greater data rate $R_{pc}$ in policy tree 39 than its child scheduling engines. The virtual time of the parent scheduling engine 60 will advance on the basis of the rate $R_{pc}$. This means that the packet's calculated start and finish times will tend to be in the future relative to the virtual time of the parent scheduling engine. This gives the parent class time to service other child scheduling engines.

Each leaf class of policy tree 39 has a priority. Each packet that passes through a leaf scheduling engine 60 is assigned the priority of the leaf class. Information identifying the priority of a packet is passed to each scheduling engine 60 which handles the packet. A scheduler 50 may support two or more levels of priority. A simple two level priority scheme, as shown in the priority tree of FIG. 4, designates high priority classes as "real-time" and lower priority classes as "best effort". A non-leaf scheduling engine 60 selects the next packet to be transmitted to its parent scheduling engine 60 from among the zero or more packets which are being held by its child scheduling engines 60. If there are two or more packets being held by its child scheduling engines 60 then the non-leaf scheduling engine 60 uses the priority, start time, and finish time of the two or more packets to select one packet to hold and eventually transmit to its parent scheduling engine 60. As a strategy, high priority is assigned to classes that require small transmission delays. Lower priorities are assigned to classes that can tolerate larger delays.

Each parent scheduling engine 60 selects a group of packets which are eligible for transmission according to an eligibility criterion. Preferably the set of eligible packets is constructed by identifying those packets being held by child scheduling engines 60 of the parent scheduling engine 60 whose start times are smaller than or equal to the virtual time of the parent scheduling engine 60 (step 110). In other words a packet is eligible if its predicted start time has passed.

If one or more packets are being held by child scheduling engines 60 but none of them are eligible then the virtual time of the parent scheduling engine is advanced to the start time of the packet or packets being held by child scheduling engines 60 which have the earliest start time. The set of eligible packets is then identified based on the new virtual time (step 110).

After a set of eligible packets has been identified, the parent scheduling engine 60 determines whether the eligible packets all have the same priority or have different priorities (step 112). If the set of eligible packets includes packets which have two or more different priorities, parent scheduling engine 60 identifies the highest priority assigned to one or more packets in the eligible set. Any packet in the eligible set which does not have the highest priority is removed from the set (step 118).

As an alternative to constructing an initial set of eligible packets and subsequently modifying the set to create a sub-set which contains only the highest priority eligible packets, a scheduling engine 60 could take priority into consideration while identifying eligible packets. The eligible set would then contain only those packets which have a start time which makes them eligible to be transmitted and which also have a highest priority.

After an eligible set has been constructed then the parent scheduling engine 60 selects one packet to pass on next to its parent scheduling engine according to a selection criterion (step 114 or 120). For example, in preferred embodiments of the invention, the scheduling engine 60 selects for transmission the highest priority eligible packet 51 which has the earliest finish time. A less preferable selection criterion selects the highest priority eligible packet with the earliest start time. If two or more packets have the same finish time (or start time), the scheduling engine 60 may select one of the packets at random.

Figure 8:
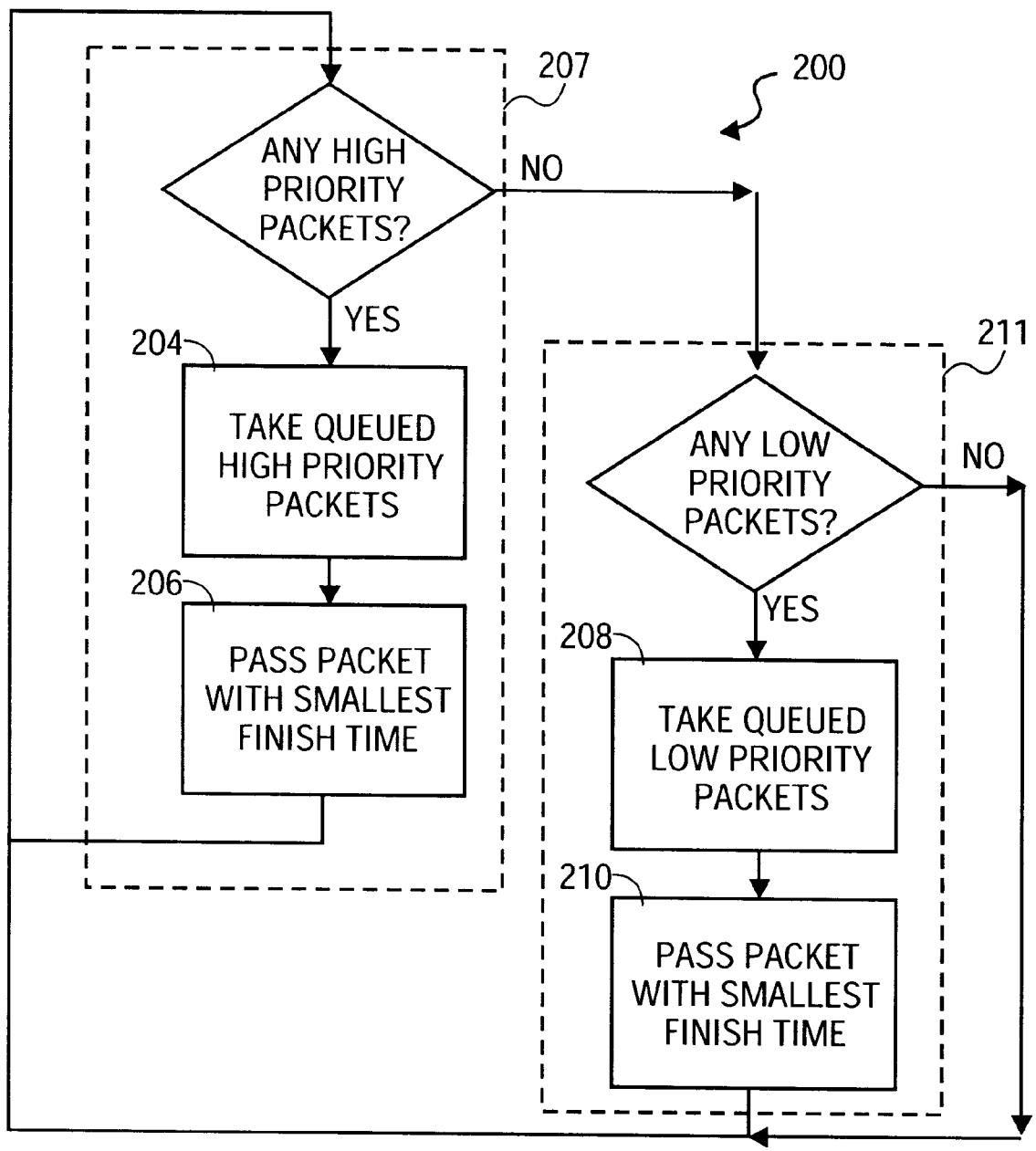

Parent scheduling engines 60 could use a simplified method which does not use start time to determine eligibility. FIG. 8 illustrates this simplified embodiment of the invention being used in a situation where packets have one of two priority levels. Each packet may be a high priority (or "real time") packet or a low priority (or "best effort") packet. Simplified method 200 begins by selecting all high priority packets which are currently queued (step 204). The method continues by passing the one high priority packet having the smallest finish time F (step 206). In the alternative, step 206 could pass the packet having the smallest start time S. If there are no queued high priority packets then the method selects all queued low priority packets (step 208) and continues by forwarding the low priority packet with the smallest finish time F (step 210). In the alternative, step 210 could pass the packet having the smallest start time S. If there are no packets in any queue then the scheduling engine simply waits. The steps of selecting and forwarding high priority packets may be performed as a single step (e.g. if there are any queued high priority packets, selecting and forwarding the queued high priority packet with the smallest finish time) as indicated by 207 and the step of selecting and forwarding the low priority packet may also be performed as a single step (e.g. if there are any queued low priority packets, selecting and forwarding the queued low priority packet with the smallest finish time) as indicated by 211. The use of finish time as a selection criterion still provides coarse-grained control over bandwidth usage, but there will be short term fluctuations either side of the assigned bandwidth. A disadvantage of the simplified method of FIG. 8 is that no lower priority packets will be forwarded over the data link as long as there are higher priority packets to be sent.

Each time a parent scheduling engine 60 selects a packet being held by one of its child scheduling engines, scheduler 50 removes the selected packet from the child scheduling engine to the parent scheduling engine, where it is held. After the packet moves from a child scheduling engine 60 to the scheduling engine which is the parent of that child scheduling engine 60 (step 122) then the virtual time of the child scheduling engine is updated (step 125) and the child scheduling engine will select a new packet.

As noted above, first level scheduling engine 60C, which may be termed a "root" scheduling engine does not have a parent class that pulls packets upwards. Instead a forwarder 58 iteratively retrieves packets from root scheduling engine 60C and sends the packets out the logical output port. Each time a packet is retrieved by scheduler 58, root scheduling engine 60C selects another packet from among packets being held by its child scheduling engines for transmission.

There are two main different ways of implementing scheduler 50. Scheduler 50 could be a single entity that traverses policy tree 39, stopping at each node to provide the function of each scheduling engine 60. Such a scheduler 50 could be implemented as software running on a general purpose CPU or it could be implemented as a hardware device (e.g. an ASIC). In the alternative, scheduler 50 could be implemented as a set of much simpler entities, with a separate entity providing the function of each scheduling engine 60. Each simple scheduling engine 60 could be implemented as a software entity running on a general purpose CPU. Alternatively each simple scheduler could be implemented as a hardware entity and combined with other simple schedulers into a parallel processing hardware device.

In some cases it is desirable to expedite the transmission of high priority packets which arrive after a packet has been selected by a scheduler 50. Consider, for example, the scheduler 150 of FIG. 7. Scheduler 150 has 9 leaf scheduling engines, 160A through 160I. Each leaf scheduling engine receives packets which have been classified in a particular class by a classifier. Scheduler 150 has 5 non-leaf scheduling engines 160J through 160N. Each scheduling engine uses the methods of the invention to select and hold one data packet. That one packet is then available for selection by the parent of the scheduling engine holding the packet.

Figure 7:
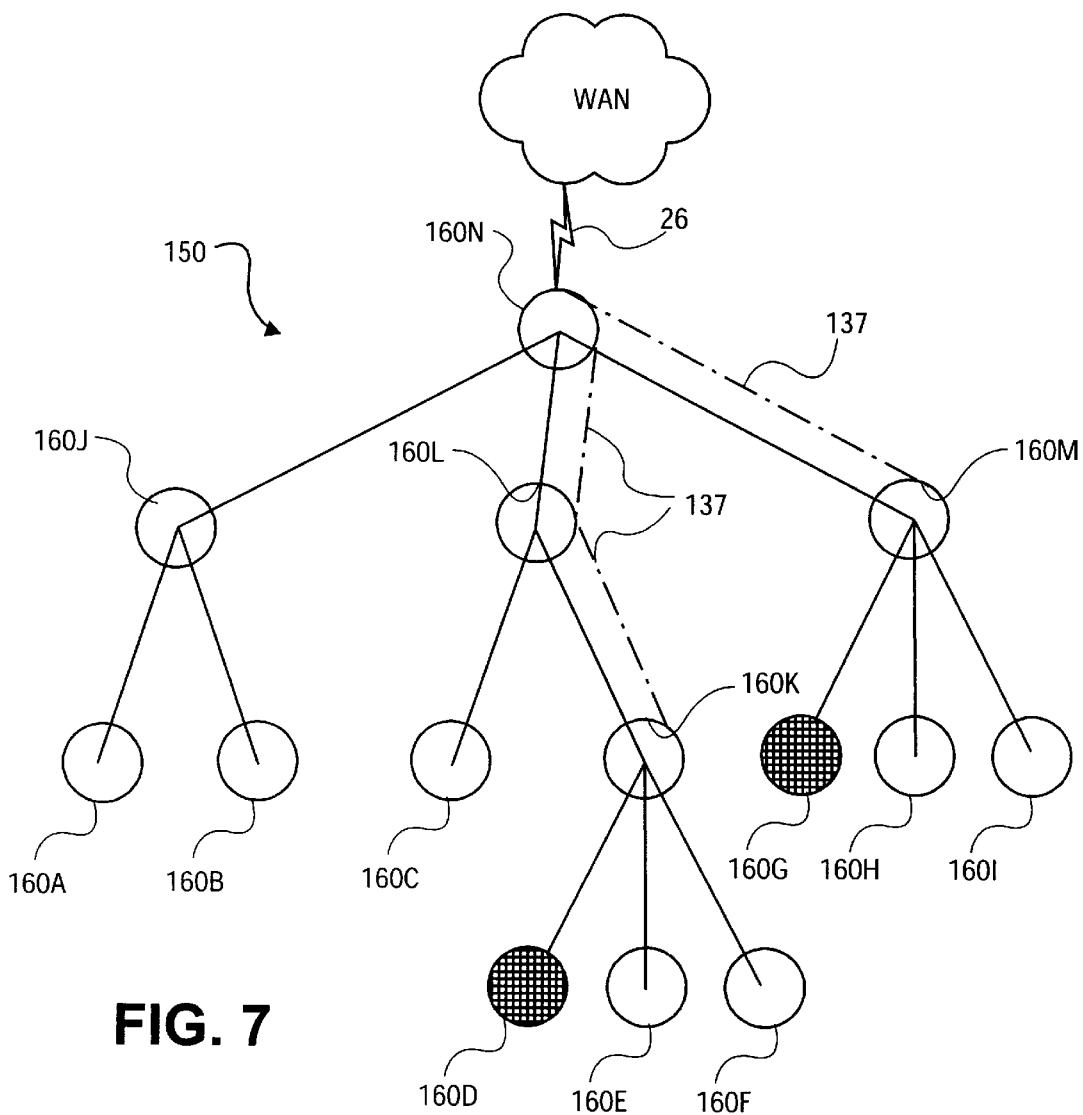
FIG. 7 is a diagram of a scheduler implemented by a number of hierarchically arranged scheduling engines according to the invention; and, FIG. 8 is a flow chart illustrating a simplified embodiment of the invention.

In FIG. 7, leaf scheduling engines 160D and 160G correspond to real time classes. The other leaf scheduling engines correspond to best effort classes. Consider the situation that would exist for a high priority packet received at scheduling engine 160D when scheduler 150 system is backlogged. If the high priority packet is received after scheduling engine 160K has already selected a lower priority packet to be held for future selection by scheduling engine 160L then the high priority packet would normally need to wait until after the selected lower priority packet has been selected by scheduling engine 160L before it can itself become eligible to be selected and held by scheduling engine 160K. This might unduly delay transmission of the high priority packet.

According to an alternative embodiment of the invention, scheduling engines could pass a newly arrived high priority packet in place of an already selected lower priority packet. The virtual time V at scheduling engine 160K is updated after the higher priority packet is sent. The already selected lower priority packet retains its place in line and will be forwarded to scheduling engine 160L next (as long as another higher priority packet does not arrive in the meantime). If each scheduling engine encountered by the higher priority packet implements this alternative embodiment of the invention then high priority packets can flow quickly upward through scheduler 150 along lines 137. This alternative embodiment of the invention provides lower latency for high priority packets at the possible expense of unfairness to lower priority packets. This method for expediting the scheduling of high priority data packets may be combined with the simplified method for selecting data packets, which is described above.

For example, to implement this alternative embodiment of the invention each non-leaf scheduling engine 60 may be capable of holding a packet for each of two or more priority levels supported by scheduler 50. In a scheduler 50 that supports two priorities, real time and best effort, each non-leaf scheduling engine 60 would be capable of holding two packets. Since leaf scheduling engines 60 are associated with a single priority in preferred embodiments of the invention it is not necessary for leaf scheduling engines 60 to hold more than a single packet at a time. Each scheduling engine 60 continues to have a single virtual time. Each packet that is held by a non-leaf scheduling engine 60 has its own start and finish time.

When a parent scheduling engine 60 selects a packet from one of its child scheduling engines 60, it initially considers only the highest priority packets being held by the child scheduling engines 60. If none of those packets are eligible, it considers the next highest priority packets being held by the child scheduling engines 60. The parent scheduling engine 60 continues checking for packets of ever lower priority until it finds an eligible packet. If no eligible packets are found, but the child scheduling engines 60 are holding on to one or more packets, the virtual time of the parent scheduling engine 60 is advanced to the earliest start time of those packets being held. The selection algorithm is repeated again starting at the highest priority.

Those skilled in the art will appreciate that with the methods of this invention one can provide a scheduler for forwarding a mixture of higher and lower priority data packets. The algorithm used by the preferred embodiment of this invention is similar to a $WF^2Q+$ algorithm, but with the methods of this invention, packets can be scheduled in a manner that simultaneously takes into consideration bandwidth allocation and priorities. Previous implementations of $WF^2Q+$ algorithms have been able to schedule on the basis of bandwidth allocation, but not on the basis of priority.

Another advantage of preferred embodiments of this invention is that unused bandwidth in one part of a policy tree can be used by another part of the policy tree. A sub-tree of the policy tree may hold no packets. At the top of the sub-tree will be a single class which does not hold a packet. Its parent class will use the bandwidth assigned to the sub-tree by selecting packets from its other child classes more frequently.

As will be apparent to those skilled in the art in the light of the foregoing disclosure, many alterations and modifications are possible in the practice of this invention without departing from the spirit or scope thereof. For example, while the invention has been described primarily with reference to IP packets, the invention could also be practised with packets formatted for other network protocols.

While the invention has been described as providing a separate scheduling engine corresponding to each leaf class in a priority tree, some benefits of the invention could be obtained by providing a single leaf scheduling engine 60 responsible for selecting and forwarding packets from two or more sets of queues containing packets classified in two or more different classes. Where packets classified in the two or more different classes have different priorities then the leaf scheduling engine could be implemented in a manner similar to that described above for a non-leaf scheduling engine. While this approach is not generally desirable it does provide a method for scheduling packets in a manner that simultaneously takes into consideration bandwidth allocation and priorities. For example, where it is desired to forward data packets which may be classified in a high priority class or a lower priority data packets over a data link, one could practice the invention by providing a plurality of queues each capable of holding one or more of the data packets. If there is a data packet which is classified in a high priority class at the head of any of the queues, that data packet, or another data packet at the head of a queue and classified in a class having the same high priority should be sent next. The method therefore selects one data packet from a first eligible group consisting of the one or more data packets which are at heads of the queues and are classified in the one or more equally high priority classes to forward over the data link. The method preferably applies a first to finish selection criterion to the data packets in the first eligible group. If there are no data packets in the first eligible group but there are data packets in the queues which are classified in one or more lower priority classes, the method selects one data packet from a second eligible group consisting of data packets which are at heads of the queues and are classified in the one or more lower priority classes to forward over the data link. Once again, the method preferably applies a first to finish selection criterion to data packets in the second eligible group. The selected data packet is then forwarded over the data link. This variant of the invention is considered to come within the scope of the invention.

Preferred implementations of the invention may include a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

Accordingly, the scope of the invention is to be construed in accordance with the substance defined by the following claims.

We claim:

1. A method for scheduling transmission of data packets on a data link, the method comprising:
   a) receiving data packets, each data packet belonging to one of a plurality of classes, the classes having priorities, and assigning each data packet to one of a plurality of queues, each queue capable of accommodating at least one data packet;
   b) from a group comprising data packets in the plurality of queues selecting an eligible group of data packets, the eligible group comprising data packets which satisfy an eligibility criterion;
   c) determining whether data packets in the eligible group all belong to one or more classes having the same priority or belong to two or more classes having different priorities;
   d) if the data packets in the eligible group belong to two or more classes having different priorities, selecting one data packet for transmission on the data link by applying a selection criterion to an eligible sub-group, the eligible sub-group containing those one or more data packets which are in the eligible group and belong to one or more classes having a highest priority;

e) if the data packets in the eligible group all belong to classes having the same priority, selecting one data packet for transmission on the data link by applying a selection criterion to all data packets in the eligible group, wherein the selection criterion comprises a first to finish selection criterion wherein the first to finish selection criterion comprises selecting a packet having a smallest finish time F where F is given by:

$$F_i = S_i + \frac{L_i}{p_{i-}R}$$

where $S_i$ is a start time for the packet, $L_i$ is a length of the packet, R is a data rate of the data link, and $p_i$ is a proportion of the capacity of the data link to which the packet is entitled wherein $p_i = Q_i/N$ where $Q_i$ is a proportion of the capacity of the data link to which a leaf node with which the packet is associated is entitled and N is a number of active queues at the leaf node; and, f) forwarding the selected packet.

2. The method of claim 1, wherein each queue is associated with a single class and receives only packets classified in the single class.

3. The method of claim 1, wherein each class has one of two priorities.

4. The method of claim 1 comprising maintaining a virtual time value wherein selecting packets which satisfy the eligibility criterion comprises selecting packets having a start time less than or equal to the virtual time value.

5. The method of claim 4 comprising updating the virtual time value after each time a packet is forwarded.

6. The method of claim 5, wherein the updated virtual time value, $V_i$, is given by:

$$V_i = V_{i-1} + \frac{L_i}{R}$$

where $V_{i-1}$ is a previous virtual time value, $L_i$ is a length of the forwarded packet and R is a data rate of the link on which the packet is forwarded.

7. A method for scheduling transmission of data packets on a data link, the method comprising:

a) providing a plurality of scheduling engines interlinked to form a hierarchical tree, the hierarchical tree including at least a parent scheduling engine and a plurality of child scheduling engines linked to the parent scheduling engine, each of the child scheduling engines adapted to select and hold a data packet for eventual selection by the parent scheduling engine, the data packets each belonging to one of a plurality of classes, the classes each having a priority;

b) in the parent scheduling engine selecting one data packet from among the data packets being held by the child scheduling engines:
   i) selecting an eligible group of data packets, the eligible group consisting of fewer than all of the data packets being held by the child scheduling engines and then selecting the one data packet from among data packets in the eligible group;
   ii) if there are any high priority data packets being held by any of the child scheduling engines, selecting one high priority data packet by applying a selection criterion to high priority data packets held by the child scheduling engines;
   iii) if there are no high priority data packets held by any of the child scheduling engines but there are low priority data packets held by one or more of the child scheduling engines, selecting one low priority data packet by applying a selection criterion to low priority data packets being held by the child scheduling engines.

8. The method of claim 7, wherein selecting the eligible group comprises selecting data packets being held by the child scheduling engines which have a finish time less than a virtual time value for the parent scheduling engine.

9. The method of claim 8 comprising updating the virtual time value each time a packet is passed on by the parent scheduling engine.

10. The method of claim 9, wherein the updated virtual time value, $V_i$, is given by:

$$V_i = V_{i-1} + \frac{L_i}{R}$$

where $V_{i-1}$ is a previous virtual time value, $L_i$ is a length of the packet passed on and R is a data rate of the link on which the packet is forwarded.

11. The method of claim 7, wherein the selection criterion is a first to finish selection criterion.

12. The method of claim 7 comprising, whenever a data packet belonging to a high priority class becomes available for selection by a child scheduling engine and a data packet already selected and being held by that child scheduling engine belongs to a lower priority class, making the data packet belonging to the high priority class available for selection by the parent scheduling engine in place of the already selected data packet.

13. The method of claim 7, wherein the hierarchical tree comprises a plurality of leaf nodes, one or more queues are associated with each leaf node, the one or more queues associated with one leaf node receive only data packets belonging to a class having a high priority and the one or more queues associated with another leaf node receive only data packets belonging to a class having a lower priority.

14. The method of claim 7 comprising passing a value representing a priority of a class to which the selected packet belongs to the parent scheduling engine.

15. The method of claim 7, wherein the selection criterion is a first to finish selection criterion.

16. A method for scheduling transmission of data packets on a data link, the method comprising:

a) providing a plurality of schedulers interlinked to form a hierarchical tree, the hierarchical tree including a first scheduler adapted to select data packets from among data packets selected by one or more child schedulers, the first scheduler having a parent scheduler adapted to select data packets from a group of one or more data packets including a data packet selected by the first scheduler each child scheduler adapted to select data packets from data packets at heads of one or more queues, each queue capable of receiving one or more data packets, the data packets each belonging to a class, each class having one of two or more priorities;

b) in the first scheduler:
   i) providing locations for holding one data packet from each of a plurality of different priorities, and, if any of the locations is vacant and the eligible group includes one or more data packets belonging to classes having the same priority as a priority corresponding to the vacant location, selecting from the eligible group one data packet belonging to a class having the same priority as the priority corresponding to the vacant location;

ii) from a group comprising data packets selected by the child schedulers, selecting an eligible group of data packets, the eligible group comprising data packets eligible for transmission according to an eligibility criterion;

iii) if the data packets in the eligible group do not all belong to classes having the same priority, selecting one data packet from the eligible group by applying a selection criterion to an eligible sub-group, the eligible sub-group containing those one or more data packets which are in the eligible group and belong to classes having a priority higher than or equal to a priority of every other class of packet in the eligible group;

iv) if the data packets in the eligible group all belong to classes having the same priority, selecting one data packet by applying a selection criterion to all data packets in the eligible group; and, v) making the selected data packet available for forwarding by the parent scheduler.

17. The method of claim 16, wherein the eligibility criterion selects packets having a finish time smaller than or equal to a virtual time of the first scheduler.

18. The method of claim 16, wherein the eligibility criterion selects packets having a start time smaller than or equal to a virtual time of the first scheduler.

19. The method of claim 17, wherein the selection criterion comprises a first to finish selection criterion.

20. The method of claim 19, wherein the first to finish selection criterion comprises selecting a packet having a smallest finish time F where F is given by:

$$F_i = S_i + \frac{L_i}{p_i \_ R}$$

where $S_i$ is a start time for the packet, $L_i$ is a length of the packet, R is a data rate associated with the first scheduler, and $p_i$ is a proportion of the data rate to which the child scheduler is entitled.

21. Apparatus for scheduling transmission of data packets on a data link, the apparatus comprising:

a) a memory capable of holding a plurality of data packets queued in a plurality of queues;

b) means for keeping a start time, a finish time and a priority for a packet at a head of each of the queues;

c) a scheduling engine adapted to select one packet from a plurality of packets at the heads of the queues, the scheduling engine comprising:

i) a counter for maintaining a virtual time for the scheduling engine;

ii) means for comparing the start time for each packet to the virtual time for the scheduling engine to select an eligible group of packets;

iii) means for comparing the priorities of packets in the eligible group of packets and eliminating from the eligible group packets having a priority lower than a priority for another packet in the eligible group; and, iv) means for selecting one packet from the eligible group having an earliest finish time.

22. The apparatus of claim 21 comprising a plurality of scheduling engines linked to form a hierarchical tree, the hierarchical tree comprising one or more parent scheduling engines each linked to one or more child scheduling engines, each parent scheduling engine comprising i) a counter for maintaining a virtual time for the parent scheduling engine;

ii) means for comparing the start time for each packet held by a child scheduling engine linked to the parent scheduling engine to the virtual time for the parent scheduling engine to select an eligible group of packets;

iii) means for comparing the priorities of packets in the eligible group of packets and eliminating from the eligible group packets having a priority lower than a priority for another packet in the eligible group; and, iv) means for selecting one packet from the eligible group having an earliest finish time.

23. Apparatus for scheduling the transmission of data packets on a data link, the apparatus comprising a plurality of scheduling engines linked to form a hierarchical tree, the hierarchical tree comprising one or more parent scheduling engines each linked to one or more child scheduling engines, the one or more parent scheduling engines comprising:

i) a counter for maintaining a virtual time for the parent scheduling engine;

ii) means for comparing the start time for each packet held by a child scheduling engine linked to the parent scheduling engine to the virtual time for the parent scheduling engine to select an eligible group of packets; and, iv) means for selecting one packet having a first priority from the eligible group; and, v) means for selecting another packet having a second priority different from the first priority from the eligible group.

24. A method for scheduling transmission of data packets on a data link, the method comprising:

a) providing a plurality of scheduling engines interlinked to form a hierarchical tree, the hierarchical tree including at least a parent scheduling engine and a plurality of child scheduling engines linked to the parent scheduling engine, each of the child scheduling engines adapted to select and hold a data packet for eventual selection by the parent scheduling engine, the data packets each belonging to one of a plurality of classes, the classes each having a priority;

b) in the parent scheduling engine:

i) if any of the child scheduling engines are holding any data packets classified as having a first priority and the parent scheduling engine is not already holding a first priority data packet, selecting one of the first priority data packets by applying a selection criterion to first priority data packets held by the child scheduling engines; and, ii) if any of the child scheduling engines are holding any data packets classified as having a second priority and the parent scheduling engine is not already holding a second priority data packet, selecting one of the second priority data packets by applying a selection criterion to second priority data packets held by the child scheduling engines.

25. A method for scheduling transmission of data packets on a data link, the method comprising:

a) providing a plurality of schedulers interlinked to form a hierarchical tree, the hierarchical tree including a first scheduler adapted to select data packets from among data packets selected by one or more child schedulers, the first scheduler having a parent scheduler adapted to select data packets from a group of one or more data packets including a data packet selected by the first scheduler, each child scheduler adapted to select data packets from data packets at heads of one or more queues, each queue capable of receiving one or more data packets, the data packets each belonging to a class, each class having one of two or more priorities;

b) in the first scheduler:
  i) providing a plurality of locations each able to hold one data packet, each of the locations corresponding to a different one of the two or more priorities;
  ii) whenever one or more of the locations is vacant, selecting an eligible group of data packets from a group comprising data packets selected by the child schedulers, the eligible group comprising data packets eligible for transmission according to an eligibility criterion; and,
  iii) for each of the vacant locations for which the eligible group comprises one or more packets belonging to a class having a priority equal to the priority of the vacant location, selecting one data packet from the eligible group by applying a selection criterion to an eligible subgroup, the eligible sub-group containing those one or more data packets which are in the eligible group and belong to classes having a priority equal to the priority of the vacant location; and,
  iv) holding the selected data packets available for forwarding by the parent scheduler.

26. The apparatus of claim 21, wherein the eligible group of packets includes packets having a start time less than or equal to the virtual time.

27. The apparatus of claim 26, wherein the scheduling engine comprises means for updating the virtual time maintained by the counter after each time a packet is forwarded.

28. The apparatus of claim 27, wherein the updated virtual time, $V_i$, is given by:

$$V_i = V_{i-1} + \frac{L_i}{R}$$

where $V_{i-1}$ is a previous virtual time, $L_i$ is a length of the forwarded packet and R is a data rate of the data link on which the packet is forwarded.

29. The apparatus of claim 23, wherein the eligible group of packets includes packets having a start time less than or equal to the virtual time.

30. The apparatus of claim 29, wherein the one or more parent scheduling engines comprises means for updating the virtual time maintained by the counter after each time a packet is forwarded.

31. The apparatus of claim 30, wherein the updated virtual time, $V_i$, is given by:

$$V_i = V_{i-1} + \frac{L_i}{R}$$

where $V_{i-1}$ is a previous virtual time, $L_i$ is a length of the forwarded packet and R is a data rate of the data link on which the packet is forwarded.

32. The method of claim 24, wherein the selection criterion is based on a first to finish criterion.

33. The method of claim 32, wherein the first to finish selection criterion comprises selecting a packet having a smallest finish time F where F is given by:

$$F_i = S_i + \frac{L_i}{p_i R}$$

where $S_i$ is a start time for the packet, $L_i$ is a length of the packet, R is a data rate associated with the first scheduler, and $p_i$ is a proportion of the data rate to which the child scheduler is entitled.

34. The method of claim 24, wherein the selection criterion is based on a start criterion.

35. The method of claim 25, wherein the eligible group of packets includes packets having a start time less than or equal to a virtual time associated with the first scheduler.

36. The method of claim 35, wherein in the first scheduler, updating the virtual time after each time a packet is forwarded out from the data link.

37. The method of claim 36, wherein the updated virtual time, $V_i$, is given by:

$$V_i = V_{i-1} + \frac{L_i}{R}$$

where $V_{i-1}$ is a previous virtual time, $L_i$ is a length of the forwarded packet and R is a data rate of the data link on which the packet is forwarded.

* * * * *